Feb. 1, 1966  G. I. HACKENBERGER, JR  3,232,565
ON-SEA RESCUE RAMP
Filed Jan. 27, 1964
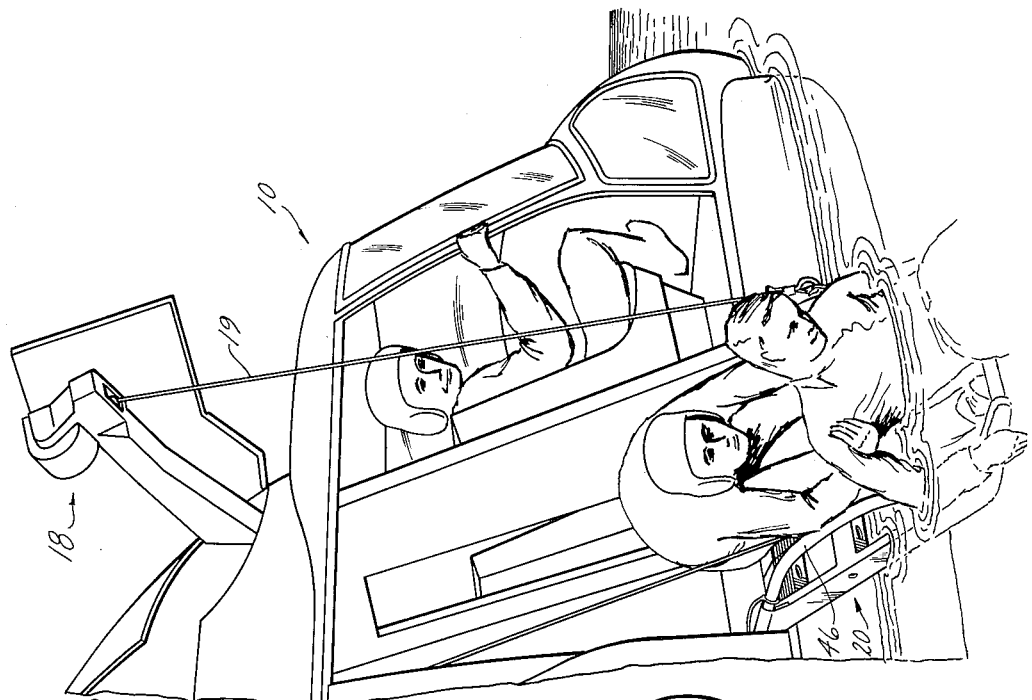
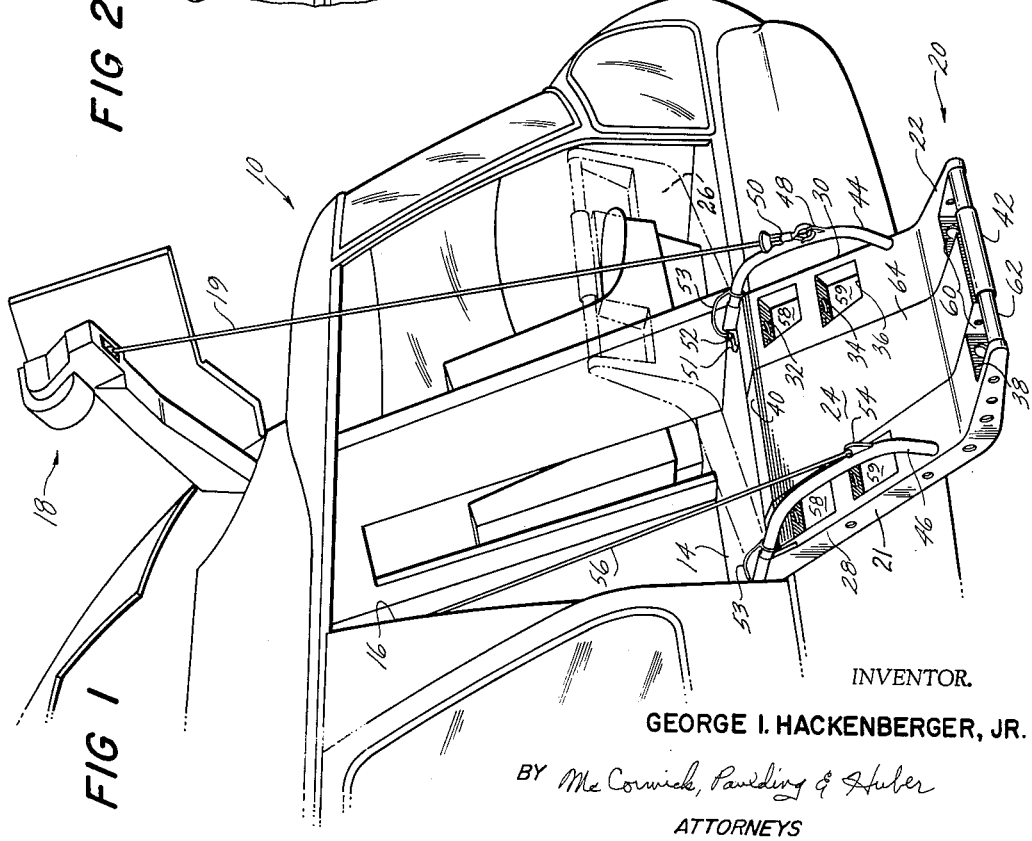
INVENTOR.
GEORGE I. HACKENBERGER, JR.
BY McCormick, Paulding & Huber
ATTORNEYS _United States Patent Office_

3,232,565
Patented Feb. 1, 1966

3,232,565
ON-SEA RESCUE RAMP
George I. Hackenberger, Jr., Suffield, Conn., assignor to Kaman Aircraft Corporation, Bloomfield, Conn., a corporation of Connecticut
Filed Jan. 27, 1964, Ser. No. 340,189
11 Claims. (Cl. 244—137)

The present invention relates to rescue devices, and more particularly to a personnel rescue ramp adapted for use in an aircraft capable of alighting on water.

A general object of the present invention is to provide an on-sea rescue ramp which allows a crewman to haul an immoblized survivor from the water and aboard the aircraft with a minimum of effort on the part of the crewman.

Another general object of the present invention is to provide an on-sea rescue ramp adapted to be raised or lowered by use of the conventional hoisting apparatus which is standard equipment on many present-day aircraft.

Still another object of the present invention is to provide an on-sea rescue ramp which can be used to advantage in rescuing either mobile or immobilized survivors.

A further object of the present invention is to provide an on-sea rescue ramp of simple and light construction having the requisite reliability for on-sea rescue operations and at the same time being suited to low-cost production.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a perspective view showing an on-sea rescue ramp embodying this invention mounted on a helicopter, the full lines showing the ramp in its lowered position and the broken lines showing the ramp in a raised position; and FIG. 2 is a perspective view showing the ramp in use.

Turning now to the drawing in greater detail, a helicopter 10 is shown on the water 12 so that the floor 14 of the cargo compartment is above the water as described hereinabove. An opening, or hatchway, 16 is provided in the fuselage of the helicopter and a conventional hoisting apparatus 18 having a hoist cable 19 is generally centered above the hatchway as shown.

According to the present invention, a rescue ramp, indicated generally at 20, is provided and is adapted to be releasably and pivotally connected to the edge of the hatchway floor 14 for movement between raised and lowered positions relative thereto. The ramp comprises a generally L-shaped body having inboard and outboard portions, 21 and 22 respectively, arranged at an angle to each other and each providing an upwardly facing surface of sufficient breadth to accommodate the body of a survivor. When the ramp is in its lowered position, as shown by the full lines of FIG. 1, the inboard portion 21 extends outwardly and downwardly from the edge of the floor 14 and the outboard portion 22 is located slightly below the water's surface and defines a generally horizontal step. The illustrated ramp includes a frame covered with a piece of sheet metal, or other skin material, 24 which provides a smooth and relatively extensive upper surface therefor. The frame consists of two side pieces 28 and 30 having a generally L-shaped configuration and a number of transversely extending stringers, some of which are shown at 32, 34, 36 and 38 in FIG. 1. If desired, and as shown in the broken line representation of FIG. 1, the bottom portion of the frame may also be covered with a piece of sheet metal, or other skin material, 26 to provide a smooth bottom surface. Such a smooth bottom surface is not essential to the invention, but its use minimizes the chances of entanglement should the survivor be swept beneath the ramp before he can be grasped, and it also permits the helicopter door to be closed during en route flight with the ramp in place within the hatchway and ready for immediate use.

The upper and lower surface or skin pieces 24 and 26 are bent into the generally L-shaped configuration of the side pieces 28 and 30 and are secured to the side pieces and to the stringers by suitable means such as rivets or welding. Adjacent its inboard end, the upper surface piece 24 is bent to provide a short transition portion 40 which, when the ramp is in its lowered position, defines a generally horizontal extension of the cargo compartment floor. Outboard of the transition portion 40, the upper surface piece 24 defines a downwardly and outwardly inclined slide which terminates in the horizontal step or platform 22. A roller 42 is provided at the outboard end of the ramp for a purpose to be discussed hereinbelow.

Fore and aft hand rails 44 and 46 respectively are provided at the side edge portions of the ramp and are suitably fixed to the frame thereof. One of these rails, as shown the forward rail 44, includes an apertured lug 48 to which the hoist cable 19 can be readily attached by the conventional hook 50 provided at the lower end of said cable. The inboard ends of the hand rails are adapted to be releasably pivotally connected to fittings 51, 51 provided therefor in the floor of the cargo compartment. In the illustrated example, each fitting 51 comprises two transversely spaced apertured arms between which the end of the associated rail is received and to which the rail is pivotally connected by means of a pin 52 passed through the apertures in the arms of the fitting and a corresponding aperture in the rail. The pin 52 associated with each rail is readily inserted and removed from the fitting 51 to permit ready installation and removal of the ramp, and to prevent loss of the pins each is conveniently attached to its associated rail by a lanyard 53. The pivotal connection provided by the fittings and pins is such as to permit movement of the ramp from the lowered full line position of FIG. 1 to, or even beyond, the raised broken line position of FIG. 1. An apertured lug is also provided on the aft hand rail 46, and a cable 56 of fixed length is attached at its upper end to the helicopter fuselage and at its lower end to the said second lug 54. The cable 56 therefore limits the downward movement of the ramp and supports the outboard end thereof a predetermined distance below the surface of the water. It has been found that locating the outboard portion of the ramp at a depth of approximately 10 inches is especially advantageous in that with the step 22 at such a depth, a floating survivor can be maneuvered quite easily into a position above the step 22 preparatory to transferring him to the cargo compartment. In this connection it should be noted that the hand rails do not extend the full length of the ramp but rather terminate at some distance inwardly of the step 22 so as to provide an unobstructed shelf for receiving the survivor.

Three pairs of foot or hand openings are also provided in the marginal side portions of the ramp. The two upper pairs of openings 58, 58 and 59, 59 are located between and defined in part by the horizontal stringers of the frame while the lowermost pair of openings 60, 60 is located between and defined in part by the lowermost stringer 38 and a bar 62 fixed to and extending between the extreme outer end portions of the side pieces 32 and 30. The bar 62 also rotatably supports the rollers 42.

It is desirable that the upper surface of the ramp be relatively slick or slippery to facilitate the sliding of a survivor thereover, and for this purpose the central portion of the upper surface may be coated with a paint or other material, as shown at 64, to enhance its slipperiness. A very suitable coating material for this use has been found to be a Teflon base material sold under the trade name "Emeralon."

Turning now to the operation of the on-sea rescue ramp, before or after the helicopter alights upon the water, the ramp is pivotally secured to the sill of the cargo hatchway by pins, as shown at 52, and is also secured to the two cables 19 and 56. The ramp is then moved to its lowered position as shown by the full lines of FIG. 1. After the helicopter is landed on the water and the ramp deployed, the pilot maneuvers the helicopter alongside the survivor. If the survivor is conscious and uninjured, he can use the hand rails or foot openings to pull himself onto the submerged step and to thereafter climb into the cargo compartment. If the survivor is immobile or injured to the point of being unable to get onto the ramp and into the helicopter by himself, a crewman may climb onto the ramp, as shown for example in FIG. 2, to assist the survivor. The hand rails 44 and 46 are readily accessible to the crewman and he can use them to steady himself. To further steady himself, the crewman can place his feet in any two of the several foot openings provided in the sides of the ramp.

After the crewman gets a hold of the survivor, he pulls the latter onto the ramp, which operation is facilitated by the roller 42 and by the slick coating 64 on the upper surface of the ramp. To complete the rescue, the crewman can move his own feet alternately up the openings in the ramp until the survivor is hauled into the helicopter, or after the survivor is moved sufficiently far onto the ramp, the ramp may be raised by the cable 19 and hoist 18 to cause the survivor to slide off of the ramp and into the cargo compartment. The unobstructed and smooth center portion of the ramp coupled with the roller at its outboard end permits the rescue to be performed with much less effort than has heretofore been required using more conventional on-sea rescue techniques.

The invention claimed is:

1. A rescue ramp for use with an aircraft capable of riding on the surface of a body of water and having a generally horizontal floor arranged so as to be slightly above said water surface when said aircraft rides thereon and also having connection means for such a ramp fixed relative to said floor, said ramp comprising a generally L-shaped body having inboard and outboard portions arranged at an angle to each other and providing an upwardly facing surface of sufficient breadth to accommodate the body of a survivor, and means on said ramp for releasably pivotally connecting said ramp to said connection means for movement of said ramp between a lowered position whereat said inboard portion thereof extends generally outwardly and downwardly from said floor and whereat said outboard portion is oriented generally horizontally below said water surface and a raised position whereat said inboard portion extends generally outwardly and upwardly relative to said floor.

2. A rescue ramp as set forth in claim 1 and further characterized by a horizontally arranged roller at the outboard end of said outboard portion.

3. A rescue ramp as set forth in claim 2 wherein said body has at least one pair of openings adjacent the side edge portions thereof, and said upwardly facing surface having a smooth center portion located between said openings.

4. A rescue ramp for use with an aircraft capable of alighting on water, said ramp comprising a generally L-shaped body having inboard and outboard portions arranged at an angle to each other and providing a smooth upwardly facing surface of sufficient breadth to accommodate the body of a survivor, and means defining openings in the side edge portions of said body for accommodating the hands or feet of a person.

5. A rescue ramp as set forth in claim 4 and further characterized by handrails at said side edge portions, which rails extend from the inboard end of said inboard portion to a point just short of said outboard portion whereby said outboard portion provides an unobstructed submerged shelf for receiving a survivor when the inboard end of said ramp is attached to said aircraft at a point slightly above the water line thereof and in such a manner as to extend downwardly and outwardly from said aircraft and into said water.

6. The combination with an aircraft having means defining a hatchway for receiving objects into said aircraft and which aircraft is capable of alighting on water so that the lower edge of said hatchway is just above the water's surface, of an on-sea rescue ramp having a smooth center portion, and means for connecting said ramp at one end to the lower edge of said hatchway defining means for movement to and from a downwardly and outwardly inclined position whereat the outboard portion thereof is positioned below the water's surface when said aircraft is alighted thereon, said outboard portion of said ramp being inclined with respect to the remainder of said ramp so as to provide a generally horizontal step beneath the water's surface when said ramp is in said downwardly inclined position and said aircraft is alighted on said water's surface.

7. The combination as set forth in claim 6 wherein said aircraft includes a hoisting apparatus with a cable hoistably connected thereto for raising and lowering objects to and from said hatchway, and wherein said ramp includes side edge portions, at least one side edge portion being adapted to be secured to the lower end of said cable whereby said ramp can be lifted upwardly from said downwardly inclined position by use of said hoisting apparatus.

8. The combination as set forth in claim 6 wherein said ramp has at least one pair of openings adjacent the side edge portions thereof.

9. The combination as set forth in claim 7 further characterized by handrails at said ramp side edge portions, a second cable of fixed length having its upper end secured to the aircraft, and lugs on each of said handrails to which the lower ends of said hoistable cable and said second cable are adapted to be connected for respectively supporting said ramp in said downwardly inclined position and for lifting said ramp from said downwardly inclined position.

10. The combination with an aircraft having means defining a hatchway for receiving objects into said aircraft and which aircraft is capable of alighting on water so that the lower edge of said hatchway is just above the water's surface, of an on-sea rescue ramp having a smooth center portion, a horizontally arranged roller at the outboard end of said ramp and means for connecting said ramp at one end to the lower edge of said hatchway defining means for movement to and from a downwardly and outwardly inclined position whereat an outboard portion thereof is positioned below the water's surface when said aircraft is alighted thereon.

11. The combination with an aircraft having means defining a hatchway for receiving objects into said aircraft and which aircraft is capable of alighting on water so that the lower edge of said hatchway is just above the water's surface, of an on-sea rescue ramp having a smooth center portion and at least one pair of openings adjacent the side edge portions thereof, a horizontally arranged roller at the outboard end of said ramp, and means for connecting said ramp at one end to the lower edge of said hatchway defining means for movement to and from a downwardly and outwardly inclined position whereat an outboard portion thereof is positioned below the water's surface when said aircraft is alighted thereon.

References Cited by the Examiner

UNITED STATES PATENTS

| 2,558,975 | 7/1951 | Moreno et al. | 244—129 X |
| 2,738,939 | 3/1956 | Johnson | 244—137 |
| 3,102,623 | 9/1963 | Schacht et al. | 244—137 X |

MILTON BUCHLER, *Primary Examiner.*

FERGUS S. MIDDLETON, *Examiner.*